United States Patent

De Sandre

[15] 3,645,441

[45] Feb. 29, 1972

[54] KEYBOARD FOR A DESK COMPUTER

[72] Inventor: Giovanni De Sandre, Milan, Italy

[73] Assignee: Ing. C. Olivetti & Co., S.p.A., Turin, Italy

[22] Filed: Oct. 24, 1969

[21] Appl. No.: 869,272

[30] Foreign Application Priority Data

Oct. 28, 1968 Italy ................................19970-B/68

[52] U.S. Cl. ........................................................235/145 R

[51] Int. Cl. .......................................G06c 7/02, G06c 25/00

[58] Field of Search ............................235/145; 197/98, 100

[56] References Cited

UNITED STATES PATENTS 2,909,320 10/1959 Malavazos .........................235/145 X 3,315,889 4/1967 Thevis ..................................235/145

3,430,226 2/1969 Chow et al. ........................235/145 X

*Primary Examiner*—Stephen J. Tomsky
*Assistant Examiner*—Stanley A. Wal
*Attorney*—Birch, Swindler, McKie & Beckett

[57] ABSTRACT

A calculator, including working registers and one or more accumulating registers, is provided with a keyboard including numerical keys, function keys and a connecting key. The connecting key, when operated, connects a selected accumulating register with a predetermined working register controlled by the function keys. The number contained in the selected accumulating register is thereby designated as an operand in the performance of a function selected by the simultaneous or subsequent operation of a function key.

1 Claims, 2 Drawing Figures

Patented Feb. 29, 1972 3,645,441

2 Sheets-Sheet 1

INVENTOR.
GIOVANNI DE SANDRE

KEYBOARD FOR A DESK COMPUTER

BACKGROUND OF THE INVENTION

The present invention relates to a calculator provided with working registers and one or more accumulating registers and comprising a keyboard having numerical keys and function keys for controlling the operations performed in the registers.

The characteristics which are normally required in computer keyboards are generally facility in use and a symbology for the keys which is the simplest possible and can be immediately understood. The employment of the keyboard may be facilitated by reducing the number of function keys and expressing all the standard commands by means of keys; by abolishing for example, register selection keys; and, by distributing the keys in a rational and simple manner for use by the operator.

Such objectives are attained in some known computers, which provide three distinct groups the numerical keys; the function keys which carry out algebraic accumulations in the accumulating registers and transfer the accumulation from the accumulating registers to the main working register; and the function keys which perform special functions on the working registers. Functional symbols hitherto traditionally accepted are used to designate the keys.

Another desirable objective is the reduction of the number of the manual operations to the minimum. The selection and performance of a specific function on numbers already inserted in the working registers or in the accumulating registers must be effected by means of a single movement of the hand. Consequently all the keys must be operative in the sense that, when depressed individually or in simultaneous combination, they determine the performance of at least one function.

This object is partially attained in some keyboards in which the group of keys which operate on the accumulators comprise function keys which are distinct for each accumulator. However, in the known keyboards there are no keys for connecting with one or more accumulating registers which, by means of a single manual depression, permit the use of the numerical contents of a specific accumulating register, designated as second operand, in combination with the numerical contents of one of the working registers, designated as first operand, for the performance of special functions.

SUMMARY OF THE INVENTION

The above-mentioned objects are realized in the present invention which provides a desk computer comprising a plurality of working registers, one or more accumulating registers and a control keyboard with three groups of keys: the first group forming a keyboard for entering digits, the decimal point and the algebraic sign; the second group comprising function keys for commanding the formation of algebraic sums in the accumulating registers and for transferring the contents of the accumulating registers to a main one of the working registers; and the third group comprising further function keys for commanding the formation of special functions of the contents of two registers. A connecting key, when operated in conjunction with one of the further function keys, transfers the number contained in a predetermined accumulating register to a particular working register constituting one of the said two registers and thereby designates this number as an operand in the performance of the function selected by the operated one of the further function keys.

In particular, the arrangement of the connecting key in relation to the function keys should be such as to be ideally adapted to the hand for the simultaneous depression of a selected function key and the connecting key.

DESCRIPTION OF THE DRAWINGS

A typical electronic calculator or desk computer to which the keyboard embodying the invention is applicable has available for example three working registers and three accumulating registers. A typical computer to which this keyboard may be adapted is shown in U.S. Pat. No. 3,304,418, assigned to the assignee of this invention. It can be supposed that the three working registers participate in the performance of the functional operations in the following manner:

The first working register, called the main working register, receives all the numbers keyed in by the keyboard and the results of the operations performed; the second working register receives automatically and memorizes the first operand keyed in by the keyboard when one proceeds to key in the second operand by keyboard. The functional operations, keyed in after the introduction of the operands, normally act on the first and second working registers, which are therefore called the primary working registers. The third working register which, like the second, is not directly accessible from the keyboard, is utilized at the end of the performance of an operation for storing special data associated with the results of the operation. The three accumulators can be utilized as independent memories for the accumulation of the results of operations performed or for the memorizing of constant data.

Figure 1:
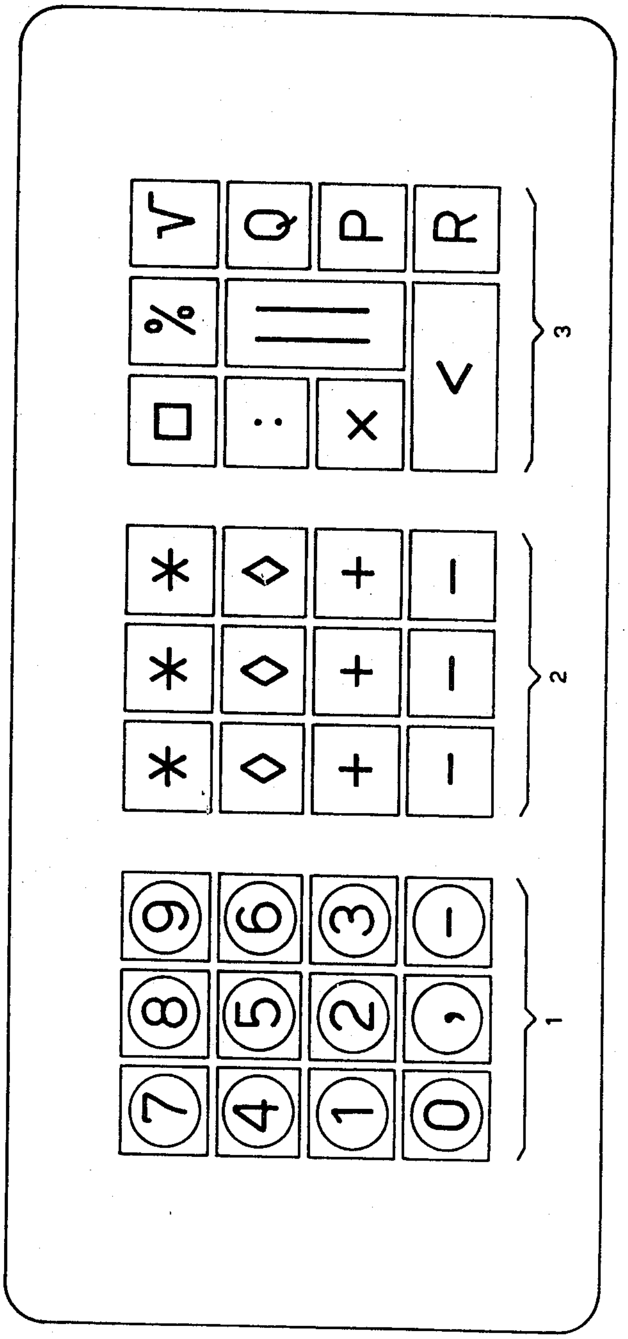
FIG. 1 represents a distribution of the keys and the designating symbology.
Figure 2:
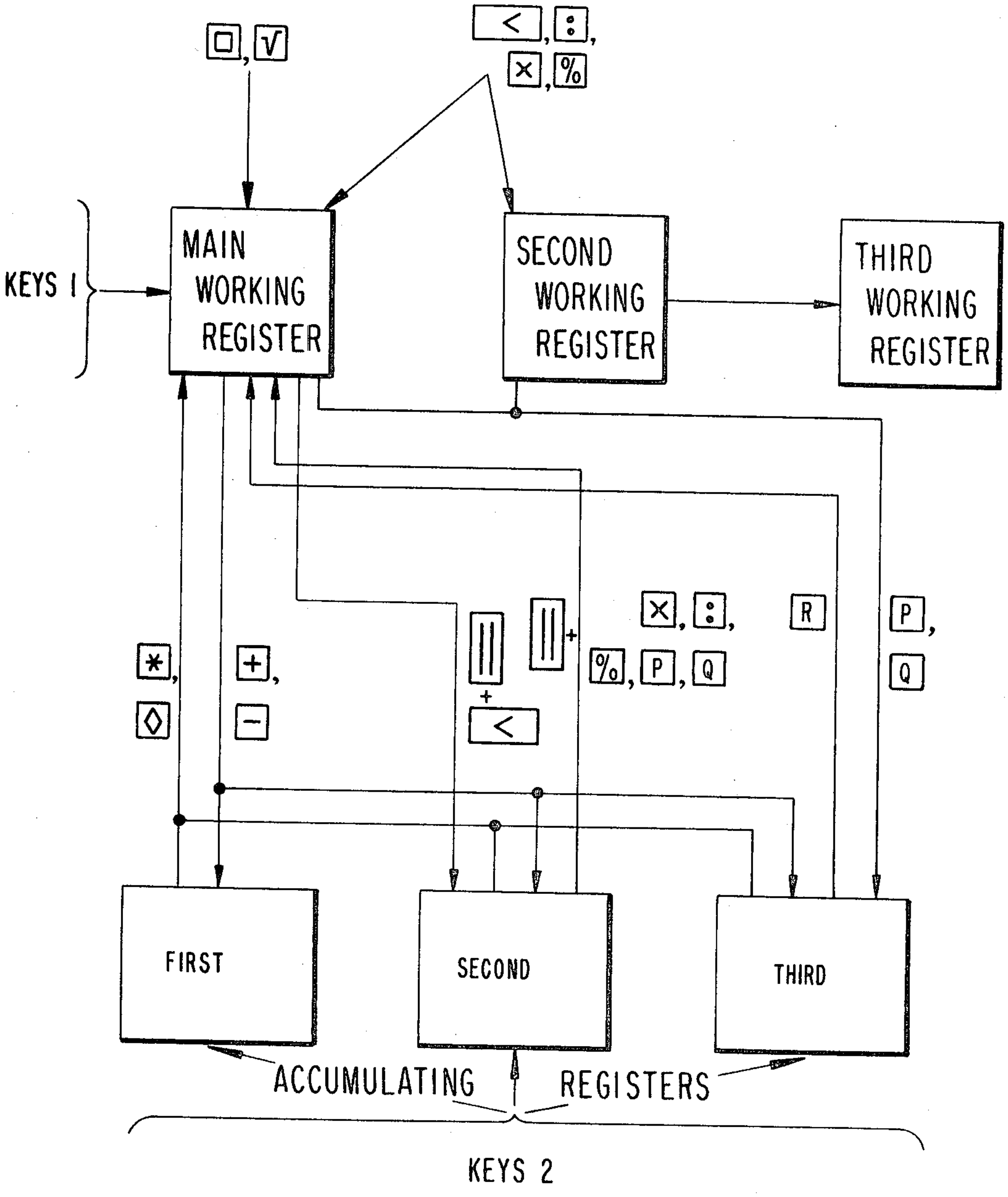
FIG. 2 illustrates the operative relationship between the keys shown in FIG. 1 and the registers of the device.

The computer keyboard is subdivided into three quite distinct groups 1, 2, 3, of equal rectangular format and occupying equal extent. In FIG. 2, a key or combination of keys appears beside each connection line schematically indicating an information transfer accomplished thereby as described in detail below.

Group 1 constitutes keyboard for entering digits 0 to 9; for the decimal point, represented as a comma "," in accordance with Continental practice; and for the algebraic sign represented as a "—", distributed in three equal columns. The numerical keyboard permits the insertion of a number, with decimal point and sign, into the main working register.

Group 2 constitutes a keyboard for algebraic totalizing and for the immediate readout of the three accumulating registers, and is formed of three equal columns, each with four keys (*,◊ ,+,—). Associated with each of these columns of keys is an accumulating register, called respectively the first, second and third accumulator.

The accumulator keys with the symbols "+" and "—" respectively command the algebraic addition and subtraction of the numerical contents of the accumulator selected with the numerical contents of the main working register. The result is registered in the selected accumulator and at the same time the printing of the number of the main working is carried out.

The accumulator keys with the symbols "*" and " ◊ " command the transfer of the numerical contents from the selected accumulator into the main working register, respectively with and without zeroing of the accumulator selected. The numerical contents are also printed.

Group 3 comprises special function keys for special functions; this group is placed at the right of the other two groups and comprises ten keys.

The keys which carry the symbols "×", ":", "□", "√", and "%", when activated after the insertion of all the operand numbers, perform respectively the operations of multiplication; division between the numbers contained in the two primary working registers; calculation of the square and of the square root of the number contained in the main working register; and of calculation of the percentage discount or premium with respect to a numerical amount first inserted in the numerical keyboard 1, and present in the second working register, of a second number introduced by the numerical keyboard 1. For all these operations the function keys also command the printing of the final result.

The special function key "<", activated after the insertion of a number into the main working register, designates that number as the first term in a subsequent functional operation and commands the printing thereof. Or, when actuated without a previous insertion, it effects an exchange of contents between the two primary working registers, and commands the printing of the final contents of the main working register.

The special function key "R" commands the transfer into the main working register of the numerical contents of the third working register, and printing of the contents. The special function key "P" commands multiplication between the numbers contained in the two primary working registers and the accumulation of the product, for example in the third accumulator. Analogously the special function key "Q" commands division between the numbers contained in the primary working registers and the accumulation of the quotient for example in the third accumulator. In addition, both the keys with the symbols "P" and "Q" command printing of the respective product and quotient.

Finally, the key marked with the symbol " ‖ " and disposed at the center of the group of the function keys 3 is a key for connecting with the second accumulator. As appears from the arrangement of the keys illustrated in the FIG., the connecting key can easily be depressed in conjunction with the function keys "×", ":", "%", "Q", "P" and "<". In particular, if the key " ‖ " is depressed in combination with one of the function keys for multiplication, division or percentage calculation, it commands the recall into a working register of the numerical content of the second accumulator, designating this number as the second term of a multiplication, division or percentage calculation respectively. Similarly, the depression of the key " ‖ " with the key "P" or "Q" designates the numerical content of the second accumulator as second operand in the operation of forming the product or quotient with the sum accumulated for example in the third accumulator. Finally, the combined depression of the key " ‖ " with the key "<" commands the zeroing of the second accumulator and the introduction thereinto of the number contained in the main working register.

Thus, the control of a computer provided with such a keyboard requires a very small number of manual operations, and can be learned practically immediately by an operator.

What we claim is:

1. A digital machine for performing mathematical operations on entered numbers comprising a plurality of working registers; at least one accumulating register; a control keyboard comprising three groups of keys, the first group comprising numerical key means for keying in digits, decimal point and algebraic sign, thereby forming an operand in one of said plurality of working registers, the second group comprising function key means for commanding the formation of algebraic sums in said accumulating register and for transferring the contents of the accumulating register to a main register of said plurality of working registers and, the third group comprising special function key means for commanding the formation of special functions of the contents of two registers of said plurality of working registers and, a connecting key operable in conjunction with a key of said special function key means, for transferring a number contained in said accumulating register to one of said two working registers thereby designating said number on an operand in the performance of a function selected by an operated key of said special function key means.

* * * * *